United States Patent
Gabre et al.

(10) Patent No.: US 11,014,192 B2
(45) Date of Patent: May 25, 2021

(54) SMART ULTRASONIC STACK AND METHOD OF CONTROLLING ULTRASONIC SYSTEM HAVING A SMART ULTRASONIC STACK

(71) Applicant: Branson Ultrasonics Corporation, Danbury, CT (US)

(72) Inventors: Thomas Gabre, New Milford, CT (US); Scott Caldwell, New Milford, CT (US); Eugene D. Pollastro, Bethel, CT (US); Dave Sulik, Shelton, CT (US); Liang Zhu, Armonk, NY (US)

(73) Assignee: Branson Ultrasonics Corporation, Danbury, CT (US)

( * ) Notice: Subject to any disclaimer, the term of this patent is extended or adjusted under 35 U.S.C. 154(b) by 140 days.

(21) Appl. No.: 16/214,497

(22) Filed: Dec. 10, 2018

(65) Prior Publication Data

US 2019/0176262 A1    Jun. 13, 2019

Related U.S. Application Data

(60) Provisional application No. 62/597,064, filed on Dec. 11, 2017.

(51) Int. Cl.
*B23K 20/10* (2006.01)
*B29C 65/08* (2006.01)
*B06B 3/00* (2006.01)

(52) U.S. Cl.
CPC ............. *B23K 20/10* (2013.01); *B06B 3/00* (2013.01); *B29C 65/08* (2013.01); *B06B 2201/40* (2013.01)

(58) Field of Classification Search
CPC .... B23K 20/10–106; B23K 1/06; B06B 3/00; B06B 2201/40; B29C 65/08
(Continued)

(56) References Cited

U.S. PATENT DOCUMENTS 5,266,921 A * 11/1993 Wilson ................... B06B 1/023
340/384.5
2007/0257088 A1* 11/2007 Steiner .................... H01L 24/85
228/110.1
(Continued)

FOREIGN PATENT DOCUMENTS

EP        3108837 A1   12/2016
JP      2012035299 A    2/2012
(Continued)

OTHER PUBLICATIONS

International Search Report and Written Opinion regarding PCT/US2018/064734, dated Apr. 10, 2019.

*Primary Examiner* — Kiley S Stoner
(74) *Attorney, Agent, or Firm* — Harness, Dickey & Pierce, P.L.C.

(57) ABSTRACT

An ultrasonic system has an ultrasonic stack excited by a power supply. The ultrasonic stack has a plurality of components, including an ultrasonic converter, a booster and an ultrasonic horn. A method of controlling the ultrasonic system with the power supply includes upon replacing any of the components of the ultrasonic stack with a replacement component, inputting an amplitude parameter of the replacement component into the power supply, determining with the power supply an amplitude of an AC excitation signal at which to excite the ultrasonic converter based on amplitude parameters of the components including the amplitude parameter of each replacement component. The power supply then sets the amplitude of the AC excitation signal at this determined amplitude.

8 Claims, 5 Drawing Sheets

(58) Field of Classification Search
USPC .............. 228/110.1, 1.1; 156/73.1–73.5, 156/580.1–580.2
See application file for complete search history.

(56) References Cited

U.S. PATENT DOCUMENTS

| | | | | |
|---|---|---|---|---|
| 2008/0032569 | A1* | 2/2008 | Steiner | B23K 20/10 439/874 |
| 2008/0150393 | A1* | 6/2008 | Funakubo | H01L 41/0913 310/316.02 |
| 2009/0013786 | A1* | 1/2009 | Gassert | B06B 1/0618 73/579 |
| 2012/0158168 | A1* | 6/2012 | Khakhalev | B23K 20/24 700/108 |
| 2014/0367018 | A1* | 12/2014 | Klinstein | B29C 66/41 156/64 |
| 2015/0236236 | A1 | 8/2015 | Lewis et al. | |
| 2015/0330952 | A1* | 11/2015 | Simon | B23K 31/125 73/588 |
| 2015/0352713 | A1* | 12/2015 | Takazakura | B23B 37/00 173/2 |
| 2018/0161914 | A1* | 6/2018 | Hauck | B29C 66/91231 |
| 2019/0143370 | A1* | 5/2019 | Caldwell | B06B 1/0611 310/317 |
| 2019/0165247 | A1* | 5/2019 | Caldwell | B29C 65/08 |

FOREIGN PATENT DOCUMENTS

| | | |
|---|---|---|
| WO | WO-2008018935 A2 | 2/2008 |
| WO | WO-2016083379 A1 | 6/2016 |

\* cited by examiner

SMART ULTRASONIC STACK AND METHOD OF CONTROLLING ULTRASONIC SYSTEM HAVING A SMART ULTRASONIC STACK

CROSS-REFERENCE TO RELATED APPLICATIONS

This application claims the benefit of U.S. Provisional Application No. 62/597,064 filed on Dec. 11, 2017. The entire disclosure of the above application is incorporated herein by reference.

FIELD

The present disclosure relates to a smart ultrasonic stack and control of an ultrasonic system having the smart ultrasonic stack.

BACKGROUND

This section provides background information related to the present disclosure which is not necessarily prior art.

Certain ultrasonic systems have an ultrasonic stack excited by an ultrasonic power supply, which is often also used to control the ultrasonic system. Examples of such ultrasonic systems include ultrasonic welders such as those used to weld together metal parts, those used to weld together plastic parts, and those used to seal ends of metal or plastic tubes (which are essentially the same as those used to weld together metal or plastic parts). They also include ultrasonic systems that cut, stake, swage and mark parts.

An ultrasonic stack includes an ultrasonic converter and any passive ultrasonic component acoustically coupled to the ultrasonic converter, typically a booster and an ultrasonic horn. It should be understood that ultrasonic converters are also known as ultrasonic transducers. It should also be understood that passive ultrasonic components are also known as acoustic ultrasonic components. It should also be understood that the ultrasonic converter is electrically excited by an ultrasonic power supply and the passive ultrasonic components are mechanically excited. It should be understood that an ultrasonic stack could have only an ultrasonic converter.

When driven by the ultrasonic converter at a particular mechanical excitation amplitude, the passive ultrasonic components each have a mechanical gain that (if not a gain of one) changes the mechanical excitation amplitude from an input end to an output end of the component. That is, the output amplitude at the output end of each component is the input amplitude at the input end multiplied by the mechanical gain of that component. The product of all the mechanical gains of the passive ultrasonic components multiplied by the mechanical excitation amplitude of the ultrasonic converter yields the overall mechanical excitation of the ultrasonic stack, and is typically the output amplitude at the output end of the ultrasonic horn.

Ultrasonic converters use piezoelectric materials to make ultrasonic excitations. The mechanical amplitude of the mechanical excitations is dictated by the mechanical gain of the ultrasonic converter and the piezo coupling coefficient (Kz) of the piezoelectric material at a given amplitude of an AC excitation signal (voltage or current amplitude) at which the ultrasonic power supply excites the ultrasonic converter. This amplitude is an amplitude of the AC voltage or current AC excitation depending on whether the power supply excites the ultrasonic converter with a constant voltage and varies current to vary the amplitude of excitation or with constant current and varies voltage to vary the amplitude of excitation. The value of d33 can vary somewhat from sample to sample for a given piezoelectric material due to manufacturing variances, therefore the mechanical amplitude of excitation can vary somewhat from ultrasonic converter to ultrasonic converter for a given ultrasonic converter design using an AC excitation signal having the same amplitude.

In the prior art, measuring the amplitude of the mechanical excitation of the ultrasonic stack at a given AC excitation current or voltage is typically performed with the entire ultrasonic stack either in situ with a linear gauge or at manufacture with a laser vibrometer. Then the AC excitation current or voltage is varied to get the desired amplitude of mechanical excitation of the ultrasonic stack.

It is also common practice in ultrasonics to have certified ultrasonic stacks where the amplitude of the mechanical excitation of an ultrasonic stack relative to the amplitude of AC current or voltage excitation is measured at manufacture. The components of the certified ultrasonic stack are then never separated.

Electronic storage has been previously used on an ultrasonic stack to merely identify an ultrasonic stack for such things as manufacturer, product name, model number, serial number, and resonant frequency. As an example, Herrmann Ultraschall has introduced an RFID on their stack that solely identifies the ultrasonic stack.

Oftentimes it is desired to swap various components of the ultrasonic stack. With the prior art, the new ultrasonic stack combination could have its amplitude of excitation measured in situ with a linear gauge. However, oftentimes it is not practical to measure this amplitude in situ. Again with the prior art, if various components of the ultrasonic stack are swapped, one does not know with precision what the actual mechanical to electrical ratio is of the entire ultrasonic stack with the new components to be able to fine tune the ultrasonic power supply to get the desired amplitude of mechanical excitation of the ultrasonic stack.

Also, because the value of $d_{33}$ can decrease over time in an ultrasonic converter, if the amplitude of excitation of the ultrasonic stack cannot be measured in situ, the true amplitude at the end of the ultrasonic stack is not known in the prior art after a period of use.

Ultrasonic stacks and their components have limited life. In the prior art, their service lives have typically not been tracked and predicted. Therefore, a user typically doesn't know when to replace components and warranty has not been based on service life, but based on date of sale. Further, ultrasonic converters are subject to failure if exposed to too high a temperature. In the prior art, the temperature of the ultrasonic converter has typically not been tracked and if the ultrasonic converter fails it was not known whether the failure was due to over-temperature.

In the prior art serial numbers, part numbers, product names and nominal values such as the nominal gain of a passive ultrasonic component have been recorded with the components of an ultrasonic stack, but operational information about the components has not been tracked resident on the components themselves or stored and linked to the components themselves. As used herein, operational information means information that quantifies operational characteristics of the component or defines the operation of the component in the ultrasonic system, as discussed in more detail below.

In the prior art, incidences of cracked ultrasonic stack components or loose joints between the components were typically either not recorded at all, or were recorded only with the power supply. Cracked components that were not thrown away could thus be mistakenly returned to service.

In the prior art, ultrasonic process recipes are stored in ultrasonic power supplies for a given ultrasonic stack and ultrasonic process. However, if the ultrasonic stack is moved to another power supply, the ultrasonic process recipe does not move with the ultrasonic stack and needs to be entered into the other power supply.

FIG. 1 shows a model of a typical prior art ultrasonic system 100 having an ultrasonic stack 102 and ultrasonic power supply 104. It should be understood that ultrasonic system 100 can be any type of ultrasonic system that has an ultrasonic stack excited by an ultrasonic power supply. Typical components of ultrasonic stack 102 include an ultrasonic converter 106, a booster 108 and an ultrasonic horn 110. It should be appreciated that not every ultrasonic stack 102 includes booster 108. It should be further appreciated that not every ultrasonic stack 102 includes ultrasonic horn 110. Ultrasonic horn 110 will often have one or more ultrasonic horn tip (not shown). Booster 108 and ultrasonic horn 110 are ultrasonically connected (directly or via another component) to ultrasonic converter 106. In the example of FIG. 1, booster 108 is mounted to ultrasonic converter 106 ultrasonically connecting booster 108 to ultrasonic converter 106, and ultrasonic horn 110 is mounted to booster 108 ultrasonically connecting ultrasonic horn 110 to booster 108, and thus ultrasonically connecting ultrasonic horn 110 to ultrasonic converter 106 via booster 108.

Power supply 104 is controlled by a controller 114 that includes memory 116. It should be understood that controller 114 can be included in power supply 104 or separate from power supply 104.

Ultrasonic system 100 will often include an anvil 122 on which a work piece to be processed will be supported and contacted by ultrasonic horn tip 112 when it is being processed. For example, if two metal or plastic parts 124 are being welded together, they are supported on anvil 122 and pressed together by the ultrasonic horn tip during the weld process as actuator 120 moves ultrasonic stack 102 relative to the two parts 124 where the horn tip also ultrasonically vibrates against one of the parts to ultrasonically weld the two parts 124 together. Actuator 120 is controlled by a controller 126 which may be a separate controller from controller 114 of ultrasonic power supply 104 or controller 114 of ultrasonic power supply 104 may control actuator 120.

SUMMARY

This section provides a general summary of the disclosure, and is not a comprehensive disclosure of its full scope or all of its features.

In accordance with an aspect of the present disclosure, an ultrasonic system has an ultrasonic stack powered by an ultrasonic power supply with the ultrasonic stack having one or more smart ultrasonic components wherein one of the smart ultrasonic components is an ultrasonic converter excited by the ultrasonic power supply. When the ultrasonic stack has more than one smart ultrasonic component, the smart ultrasonic components include the ultrasonic converter and one or more passive ultrasonic components, which in an aspect include an ultrasonic horn and in another aspect include an ultrasonic booster and an ultrasonic horn. The smart ultrasonic stack has operational information about each smart ultrasonic stack component of the smart ultrasonic stack associated with that smart ultrasonic stack component, statically or dynamically.

The foregoing may optionally include one or more of the following aspects, each of which may be combined individually with the foregoing or they can be combined in any combination with each other and the foregoing.

In accordance with an aspect of the present disclosure in addition to the foregoing aspect, having an ultrasonic power supply that excites the ultrasonic converter read the operational information associated with each smart ultrasonic stack component and having the ultrasonic power supply operate the ultrasonic system based on the read operational information.

In accordance with an aspect of the present disclosure, operational information about the smart ultrasonic stack components of the smart ultrasonic stack includes information for any of precise amplitude control of excitation signal that the ultrasonic power supply generates to excite the ultrasonic converter and one or more ultrasonic process recipes with which each smart ultrasonic stack component is associated. In an aspect, each smart ultrasonic stack component has identifying information, such as a serial number, associated with that smart ultrasonic stack component.

In accordance with an aspect of the present disclosure, the ultrasonic power supply powering the ultrasonic stack automatically retrieves the information about each component in the stack. In accordance with an aspect of the present disclosure, when the information is dynamically associated with the component, the power supply automatically stores the information at the desired location, whether at the component or remote from the component.

In accordance with an aspect of the present disclosure, the information about the ultrasonic stack components includes information about their respective ultrasonic excitation amplitudes.

In accordance with an aspect of the present disclosure, the ultrasonic power supply is configured with control logic that uses this information about the individual ultrasonic stack components of the ultrasonic stack that the ultrasonic power supply is powering and automatically adjusts the amplitude of the AC excitation voltage or amplitude of the excitation current to obtain a desired mechanical excitation amplitude at the end of the ultrasonic stack.

In accordance with an aspect of the present disclosure, the information about the ultrasonic stack components includes ultrasonic process recipe information. The ultrasonic process recipe information is automatically written and read by the ultrasonic power supply to control the ultrasonic process through the ultrasonic process recipes.

In accordance with an aspect of the present disclosure, an amplitude parameter of each component of ultrasonic stack is entered into the ultrasonic power supply. The ultrasonic power supply then calculates the overall mechanical to electrical excitation ratio, which is the product of all the amplitude parameters. The ultrasonic power supply then uses the overall mechanical to electrical excitation ratio to determine the amplitude of the AC excitation signal at which to excite the ultrasonic converter to achieve a desired overall mechanical excitation amplitude of the ultrasonic stack and sets the amplitude of the AC excitation signal at this determined amplitude.

In an aspect, the desired overall mechanical excitation amplitude is entered into the ultrasonic power supply.

In an aspect, each time a smart ultrasonic stack component is replaced with a replacement smart ultrasonic component, the operational information about the smart ultrasonic stack components used in any of the aforementioned aspects of control is updated by using the operational information about the replacement smart ultrasonic component instead of the operational information of the smart ultrasonic component that was replaced.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 4:
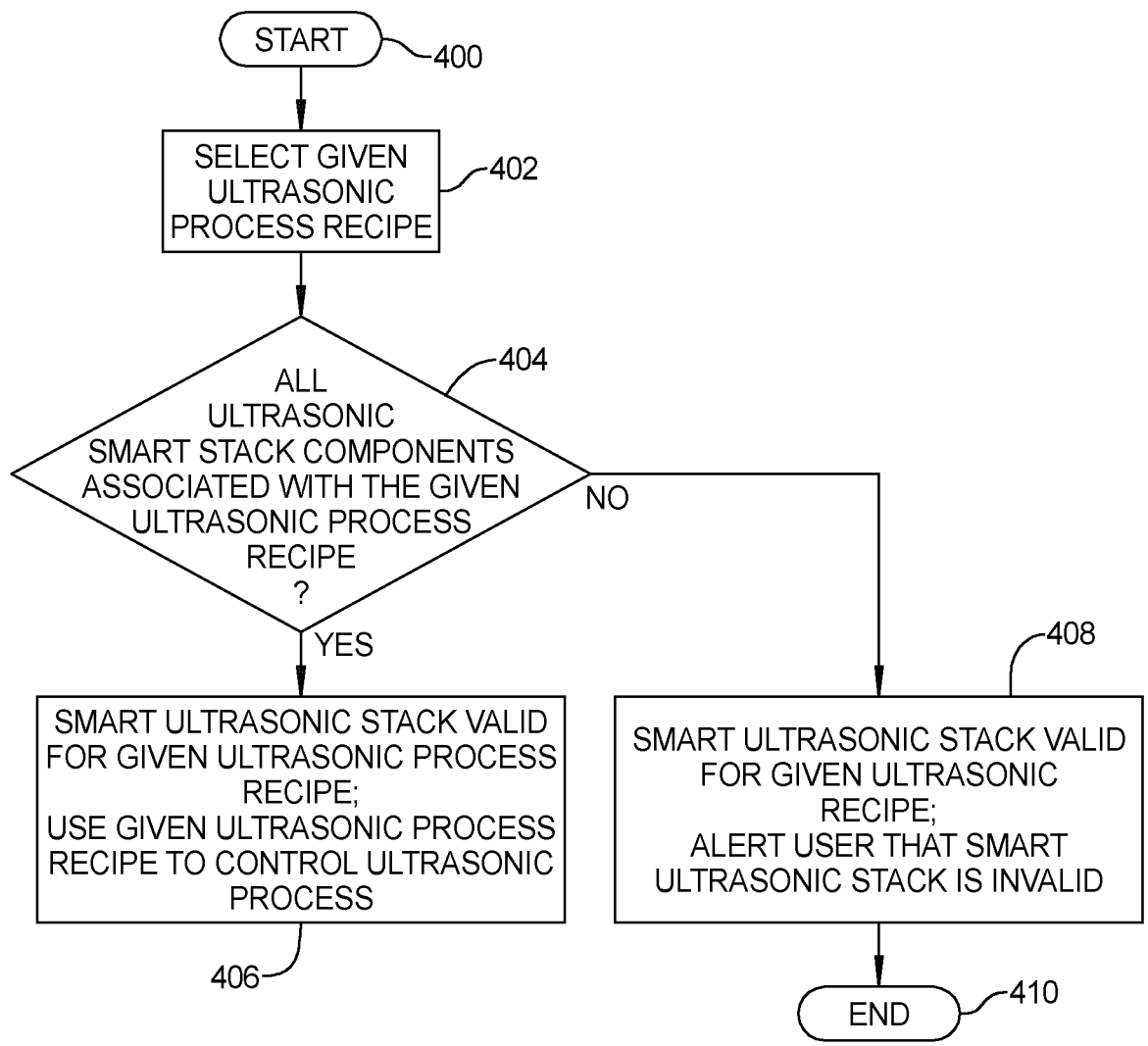
Figure 5:
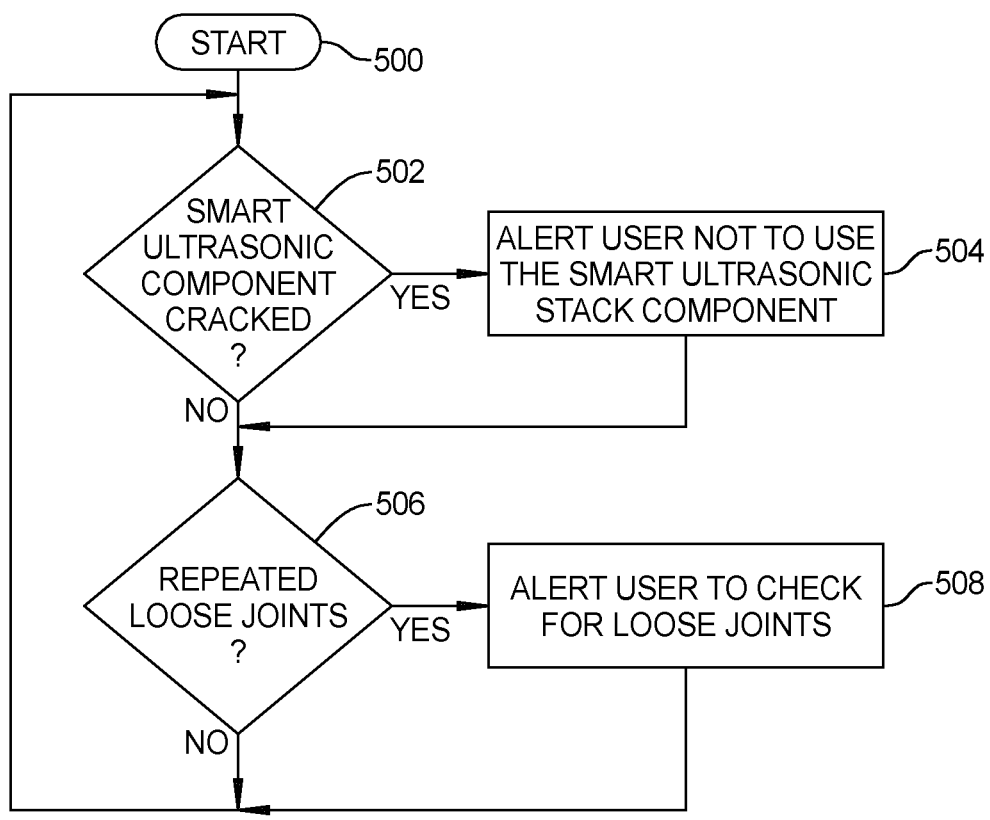

FIG. 4 is a flow chart of a control routine in accordance with an aspect of the present disclosure for using a given ultrasonic process recipe to control the ultrasonic process only after determining that smart ultrasonic stack is valid for that given ultrasonic process recipe; and FIG. 5 is a simplified flow chart of control logic of a control routine for alerting a user that a smart ultrasonic stack component is cracked and that there are repeated loose connections between smart ultrasonic stack components.

Corresponding reference numerals indicate corresponding parts throughout the several views of the drawings.

DETAILED DESCRIPTION

Example embodiments will now be described more fully with reference to the accompanying drawings.

Figure 1:
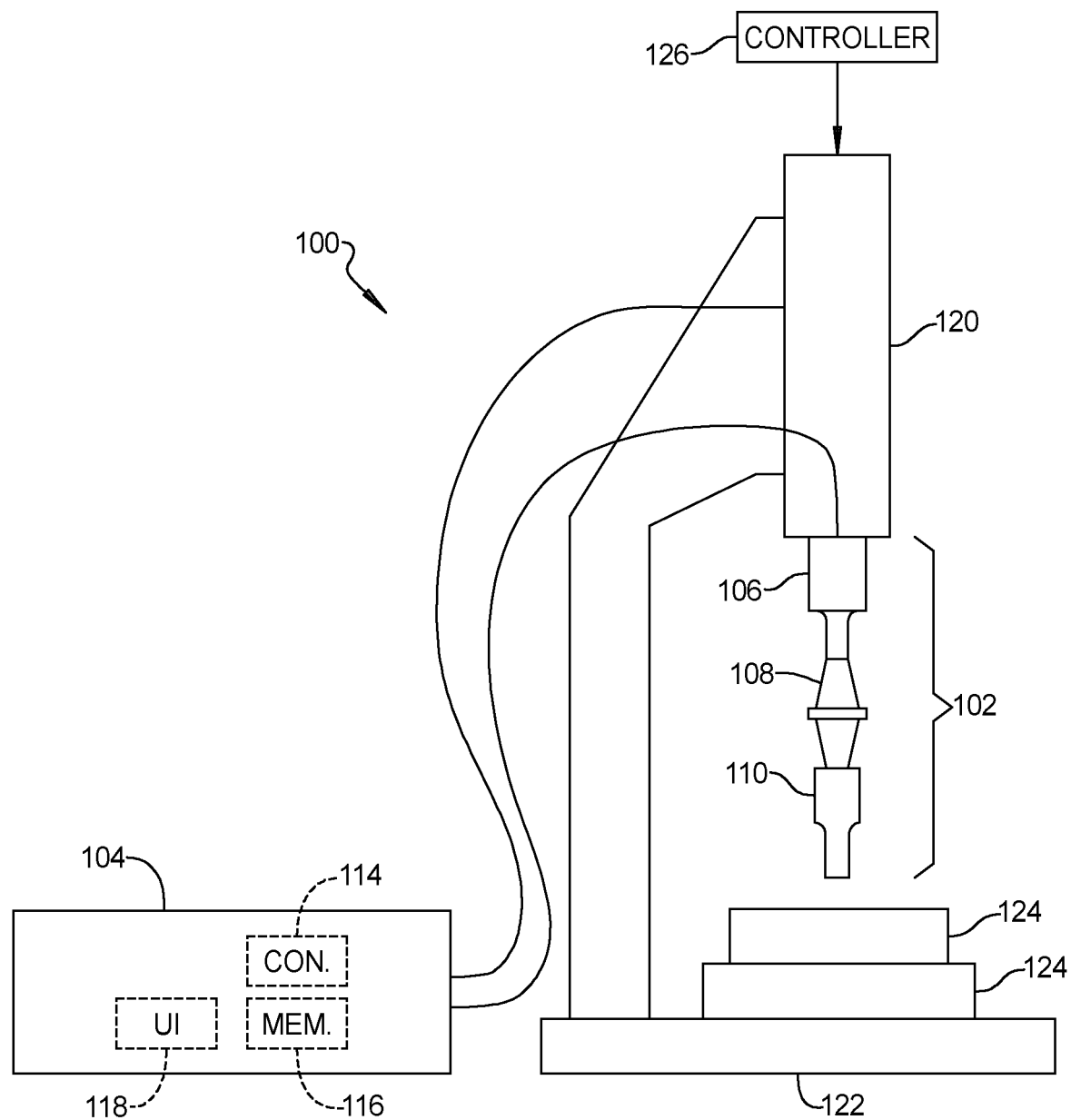
FIG. 1 is a simplified diagram of a typical prior art ultrasonic system.
Figure 2:
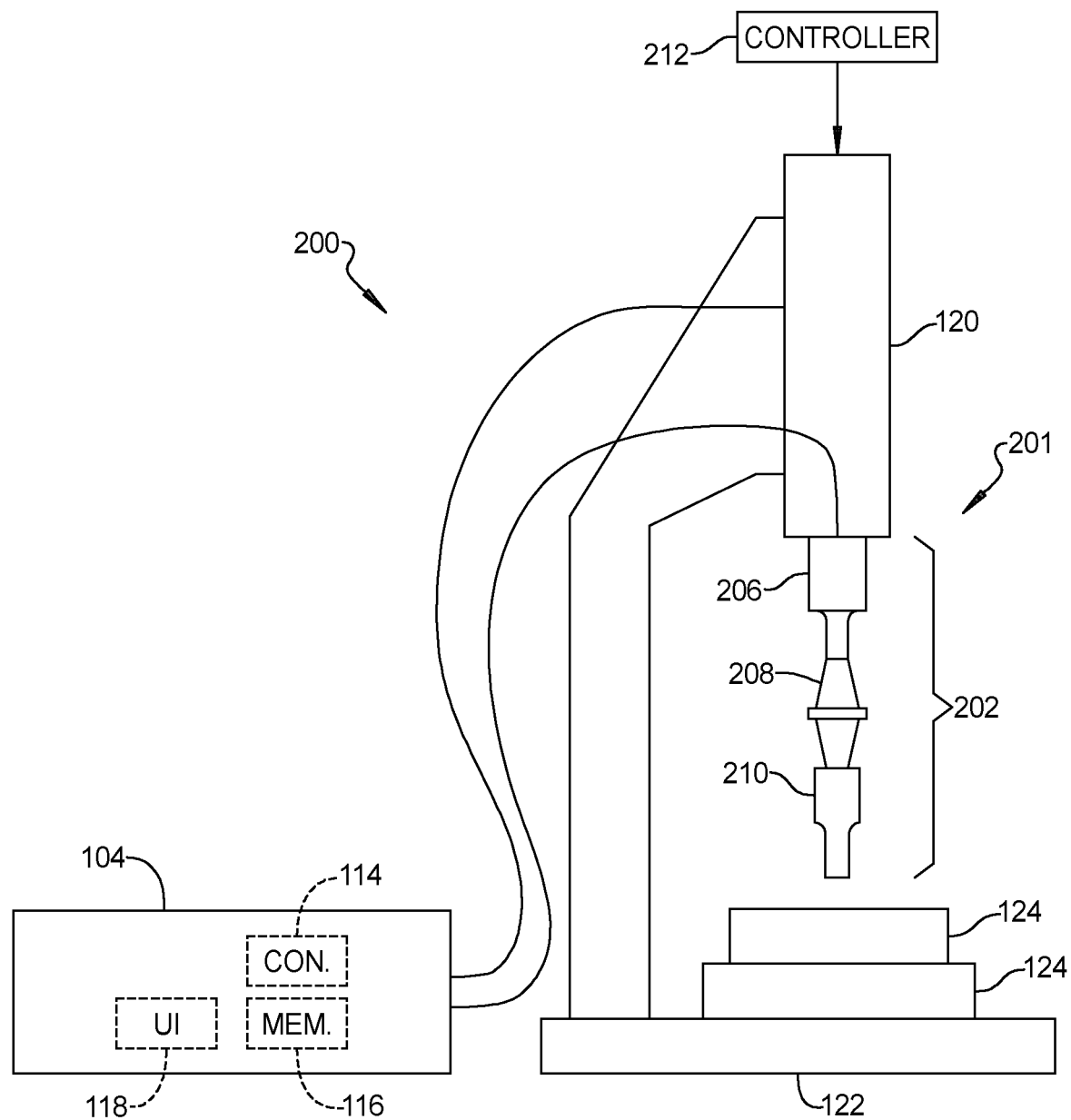
FIG. 2 is a simplified diagram of an ultrasonic system in accordance with an aspect of the present disclosure.

The following discussion will be with reference to ultrasonic system 200 of FIG. 2, but it should be understood that the following applies to any ultrasonic system that has a smart ultrasonic stack. In this regard, the identification of certain components in FIG. 2 with corresponding reference numbers from FIG. 1 does not mean that the association of operational information with smart ultrasonic stack components of the smart ultrasonic stack and the various methods of using this information in the operation of ultrasonic system 200 in accordance with the various aspects of the present disclosure does not mean that this subject matter is in the prior art.

In accordance with an aspect of the present disclosure, smart ultrasonic stack 202 of ultrasonic system 200 has operational information about each smart ultrasonic stack component 201 of the smart ultrasonic stack 202 associated with that smart ultrasonic stack component 201, statically or dynamically. As used herein, a smart ultrasonic stack is one or more converters attached to none or more passive ultrasonic components with its associated operational information and a smart ultrasonic stack component is a converter, a booster, a horn, or any other passive driven ultrasonic component with associated operational information for each component. As used herein, associating operational information about a particular smart ultrasonic stack component 201 with that smart ultrasonic stack component 201 means that the operational information is linked with the smart ultrasonic stack component 201 so that when the smart ultrasonic stack component 201 is installed in smart ultrasonic stack 202, the operational information about the particular smart ultrasonic stack component 201 can be retrieved and entered into the ultrasonic power supply 104, such as into the controller 114 that controls the ultrasonic power supply 104.

This association includes, but is not limited to, labeling the smart ultrasonic stack component 201 with the information about the smart ultrasonic stack component 201, storing the information in a memory device that is packaged with the smart ultrasonic component 201 (such as a USB memory stick) or affixed or embedded in the smart ultrasonic component 201 (such as a micro-chip), or identifying the smart ultrasonic component 201 with a unique identification code (such as a serial number) that is affixed to or packaged with the smart ultrasonic component 201 and storing the unique identification code and the information in a database with the information linked to the unique identification code. This database may be stored in memory 116 of controller 114 of ultrasonic power supply 104, or stored remotely, such as on a remote server. Labeling the smart ultrasonic stack component 201 with the operational information about it includes, but is not limited to, labeling the smart ultrasonic stack component 201, labeling the packaging for the smart ultrasonic component 201, and/or including the operational information in a package insert in the packaging, such as in a user guide or otherwise. The label can include the operational information in human readable form, machine readable form such as a bar code, QR code, or RF ID tags, or both human readable form and machine readable form. The labeling can include etching the operational information (or a code for the information) on the smart ultrasonic stack component 201, printing it on the smart ultrasonic stack component 201, or affixing a label to the smart ultrasonic stack component 201 with the information (or a code for the information) thereon.

As used herein, operational information is associated statically with a smart ultrasonic stack component 201 when the operational information remains the same once it is associated with the smart ultrasonic stack component 201 and not thereafter changed. An example is the nominal gain of the smart ultrasonic stack component. Operational Information is associated dynamically with a smart ultrasonic stack component 201 when the operational information is updated from time to time. An example includes the ultrasonic process recipe(s) associated with the smart ultrasonic stack component, such as when the ultrasonic recipe is changed or another ultrasonic recipe associated with the smart ultrasonic stack component.

In accordance with an aspect of the present disclosure, operational information about the smart ultrasonic stack components 201 of the smart ultrasonic stack 202 includes information for precise amplitude control of excitation signal that the ultrasonic power supply 104 generates to excite the ultrasonic converter 206 and one or more ultrasonic process recipes with which each smart ultrasonic stack component 201 is associated. In an aspect, each smart ultrasonic stack component 201 has identifying information, such as a serial number, associated with that smart ultrasonic stack component 201, such as described above in the Background of the present application.

In accordance with an aspect of the present disclosure, the ultrasonic power supply 104 powering the smart ultrasonic stack 102 automatically retrieves the operational information about each smart ultrasonic stack component in the smart ultrasonic stack component 201. In accordance with an aspect of the present disclosure, when the operational information is dynamically associated with the smart ultrasonic stack component 201, the ultrasonic power supply 104 automatically stores the operational information at the desired location, whether at the smart ultrasonic stack component 201 or remote from the smart ultrasonic stack component 201.

In accordance with an aspect of the present disclosure, the operational information about the smart ultrasonic stack components 201 includes information about their respective ultrasonic excitation amplitudes. In the case of an ultrasonic converter, the information about the ultrasonic excitation amplitude is the mechanical to electrical excitation ratio of the ultrasonic converter, and in the case of the other ultrasonic stack components, the information about their excitation amplitudes is their respective mechanical gains, also known as acoustical gains.

In accordance with an aspect of the present disclosure, the ultrasonic power supply 104 is configured with control logic that uses this operational information associated with the individual smart ultrasonic stack components 201 of the smart ultrasonic stack 202 that the ultrasonic power supply 104 is powering and automatically adjusts the amplitude of the AC excitation voltage or amplitude of the excitation current to obtain a desired mechanical excitation amplitude at the end of the smart ultrasonic stack 202.

In accordance with an aspect of the present disclosure, temperature, use cycles, over voltages, over currents, time and power usage of the smart ultrasonic stack components 201 and the smart ultrasonic stack 202 are tracked, as applicable, and associated as applicable with the smart ultrasonic stack components 201 and the smart ultrasonic stack 202.

In accordance with an aspect of the present disclosure, the operational information about each ultrasonic stack component 201 includes physical information about the mass, length, mechanical excitation gain (for each passive smart ultrasonic stack component 201), and material of which the smart ultrasonic stack component 201 is made.

In accordance with an aspect of the present disclosure, operational information about the smart ultrasonic stack components 201 includes service information about the smart ultrasonic stack components 201.

In accordance with an aspect of the present disclosure, the operational information about the smart ultrasonic stack components includes cracked component and loose joint information. In an aspect, when a smart ultrasonic component 201 is cracked, a user is alerted, such as by the ultrasonic power supply 104, not to use the cracked component. In an aspect, if there is a repeated loose joint between any of smart ultrasonic stack components 201, the user is alerted, such as by the ultrasonic power supply 104, to inspect the joint for possible wear.

In accordance with an aspect of the present disclosure, the operational information about the smart ultrasonic stack components 201 includes ultrasonic process recipe information (described in more detail below that is associated with a smart ultrasonic stack 202 that has smart ultrasonic stack components with which that ultrasonic process recipe information is associated. The ultrasonic process recipe information is automatically written and read by the ultrasonic power supply 104 or controller 212, as applicable, to control the actuator 120 and ultrasonic power supply 104 through the ultrasonic process recipes. An advantage of having the ultrasonic process recipe information associated with the smart ultrasonic stack 202 instead of the ultrasonic power supply power supply 104 is that when the smart ultrasonic stack 202 is moved to a different ultrasonic system, the ultrasonic process recipe will go with the smart ultrasonic stack 202.

In accordance with an aspect of the present disclosure, the operational information includes an amplitude parameter of each smart ultrasonic stack component 201 of smart ultrasonic stack 201 which is entered into ultrasonic power supply 104, illustratively controller 114 of ultrasonic power supply 104. Ultrasonic power supply 104 then calculates the overall mechanical to electrical excitation ratio, which is the product of all the amplitude parameters. Ultrasonic power supply 104 then uses the overall mechanical to electrical excitation ratio to determine the amplitude of the AC excitation signal at which to excite ultrasonic converter 206 to achieve a desired overall mechanical excitation amplitude of smart ultrasonic stack 202 and sets the amplitude of the AC excitation signal at this determined amplitude. It should be understood that the amplitude of the AC excitation signal that is set is the amplitude of the current of the AC excitation signal if ultrasonic power supply 104 is a current controlled ultrasonic power supply and the amplitude of the voltage of the AC excitation signal if ultrasonic power supply 104 is a voltage controlled ultrasonic power supply.

In an aspect, the desired overall mechanical excitation amplitude is entered into ultrasonic power supply 104, such as by a user. The user, who may be an operator of ultrasonic system 200, can then request a desired mechanical excitation amplitude of smart ultrasonic stack 202, which is also the mechanical excitation amplitude at the output end of ultrasonic horn 210, by entering into ultrasonic power supply 104 this desired mechanical excitation amplitude.

The amplitude parameter for any individual smart ultrasonic stack component 201 can be a measured value or a nominal value and the smart ultrasonic stack components 201 of smart ultrasonic stack 202 can all have measured values for their amplitude parameters, can all have nominal values for their amplitude parameters, or the amplitude parameters can be a combination of measured and nominal values where one or more smart ultrasonic stack component 201 has a measured value for its amplitude parameters and the each other smart ultrasonic stack component 201 has a nominal value for its amplitude parameters.

When a smart stack ultrasonic component 201 is deployed in a smart ultrasonic stack 202, its amplitude parameter is input into the ultrasonic power supply 104 powering the smart ultrasonic stack 202 which also has the amplitude parameters of the other smart ultrasonic stack components 201 of the smart ultrasonic stack 202. Ultrasonic power supply 104 then calculates the overall mechanical to electrical excitation ratio using the amplitude parameters for the smart ultrasonic stack components 201 that then make up smart ultrasonic stack 202 including the amplitude parameter for any newly deployed smart ultrasonic stack component 201. Illustratively, the amplitude parameters are stored in memory 118 associated with controller 114 of ultrasonic power supply 104. Ultrasonic power supply 104 then uses the newly calculated overall mechanical to electrical excitation ratio to determine the amplitude of the AC excitation signal (voltage or current) at which to excite ultrasonic converter 206 to achieve the desired overall mechanical excitation amplitude of smart ultrasonic stack 202 and sets the amplitude of the AC excitation signal at this determined amplitude. In an aspect, the desired overall mechanical excitation amplitude is input into the ultrasonic power supply 104 by a user.

Figure 3:
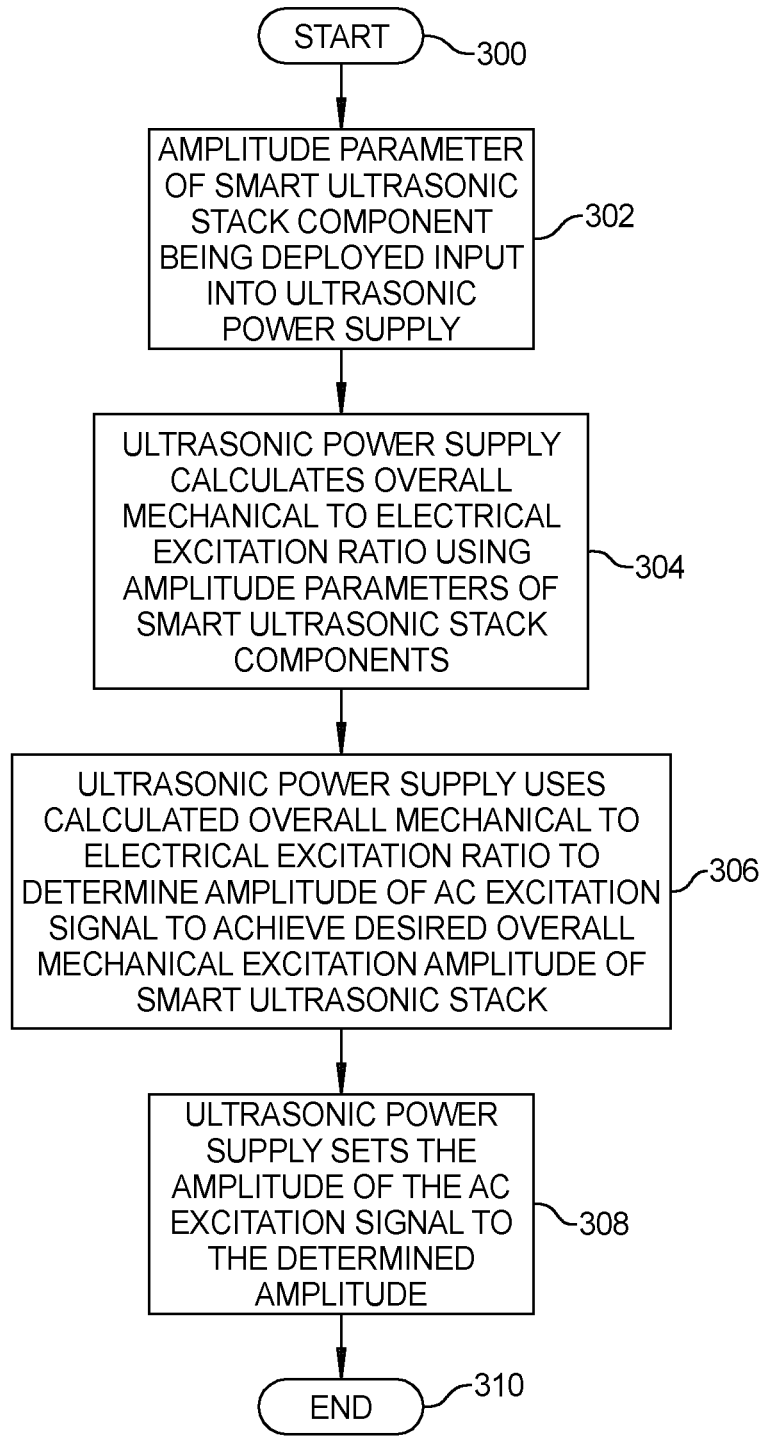
FIG. 3 is a flow chart of a control routine in accordance with an aspect of the present disclosure for determining an amplitude of an AC excitation signal at which a power supply of an ultrasonic system excites an ultrasonic converter of an ultrasonic stack of the ultrasonic system.

FIG. 3 is a simplified flow chart of control logic for a control routine of the above control of power supply 104 implemented in power supply 104, such as in controller 114 of power supply 104. The control routine starts at 300 when a smart ultrasonic component 201 is deployed in smart ultrasonic stack 202. In this regard, the smart ultrasonic component 201 may be deployed as part of the initial assembly of smart ultrasonic stack 202 or as a replacement of an existing smart ultrasonic stack component 201 of smart ultrasonic stack 202. At 302, the amplitude parameter of the smart ultrasonic component 201 being deployed is input into ultrasonic power supply 104. At 304, ultrasonic power supply 104 calculates the overall mechanical to electrical excitation ratio of smart ultrasonic stack 202 using the amplitude parameters of the smart ultrasonic stack components 201 of smart ultrasonic stack 202 including the amplitude parameter of the smart ultrasonic stack component that was deployed in smart ultrasonic stack component 202. At 306, ultrasonic power supply 104 then uses the newly calculated overall mechanical to electrical excitation ratio to determine the amplitude of the AC excitation signal at which to excite ultrasonic converter 206 to achieve the desired overall mechanical excitation amplitude of smart ultrasonic stack 202. At 308, ultrasonic power supply 104 sets the amplitude of the AC excitation signal at this determined amplitude. At 310, the control routine ends. It should be understood that if the smart ultrasonic stack component is a replacement component, the operational information associated with the replacement component is used instead of the operation information associated with the smart ultrasonic stack component that was replaced.

In an aspect, the mechanical to electrical excitation ratio of ultrasonic converter 206 (which is its amplitude parameter as discussed above) is measured when ultrasonic converter 206 is manufactured. The ultrasonic converter 206 is excited with an AC excitation signal (voltage or current) having a known amplitude and its mechanical excitation amplitude is measured, typically with a laser vibrometer. The mechanical to electrical excitation ratio is then calculated by dividing the measured mechanical excitation amplitude by the known AC excitation signal amplitude. Since this ratio is determined using the measured mechanical excitation amplitude and the known AC excitation signal amplitude, as used herein this ratio is a measured mechanical to electrical excitation ratio. This measured mechanical to electrical excitation ratio is then associated with the ultrasonic converter 206, as described above.

In an aspect, the mechanical gain of each passive ultrasonic component (which is its amplitude parameter as discussed above), such as boosters and ultrasonic horns, is measured when the passive component is manufactured. For example, an ultrasonic converter with a known mechanical to electrical excitation ratio is attached to the passive ultrasonic component and excited with a known AC excitation signal (voltage or current) and the overall mechanical excitation amplitude measured, typically with a laser vibrometer. The mechanical gain of the passive component is then calculated by dividing the overall mechanical excitation amplitude by the known mechanical to electrical excitation ratio of the ultrasonic converter. This mechanical gain is then associated with the passive ultrasonic component. Since this mechanical gain is determined using the measured overall mechanical excitation amplitude and the known mechanical to electrical excitation ratio of the ultrasonic converter, as used herein this mechanical gain is a measured mechanical gain.

As is known, ultrasonic converters have nominal mechanical to electrical excitation ratios based on their designs. In an aspect, the nominal mechanical to electrical excitation ratio is associated with the ultrasonic converter 206 (which is then a smart ultrasonic stack component) when it is manufactured as the amplitude parameter of the ultrasonic converter 206. Also as is known, passive ultrasonic components have nominal mechanical gains based on their designs. In an aspect, the nominal mechanical gain is associated with the passive ultrasonic component (which is then a smart ultrasonic stack component) when it is manufactured as the amplitude parameter of the passive ultrasonic component.

For controlling the ultrasonic process, the operational information includes one or more ultrasonic process recipes that are associated with each smart ultrasonic stack component 201. A given ultrasonic process recipe would only be valid for a given smart ultrasonic stack 202 where all the smart ultrasonic stack components 201 of that smart ultrasonic stack 202 are associated with that given ultrasonic process recipe. In an aspect, the ultrasonic power supply 104 reads the identifiers for the smart ultrasonic stack components 201 of the smart ultrasonic stack 202 to be used checks whether each smart ultrasonic stack component 201 is associated with that given ultrasonic process recipe. The ultrasonic power supply 104 then verifies that the smart ultrasonic stack 202 having these specific individual smart ultrasonic stack components 201 is a valid smart ultrasonic stack 202 for the given ultrasonic process recipe when all the smart ultrasonic stack components 201 of the smart ultrasonic stack 202 to be used are associated with that given ultrasonic process recipe. As is known in the art, ultrasonic process recipes include all the information needed to control the ultrasonic process and include, but are not limited to, automated actuation control instructions for control of ultrasonic power supply 104. The ultrasonic power supply 104 upon determining that the smart ultrasonic stack 202 is valid for the given ultrasonic process recipe, then uses this ultrasonic process recipe to control the ultrasonic process. In an aspect, the ultrasonic power supply 104 reads the given ultrasonic recipe from where it is stored if it is not stored in the ultrasonic power supply 104.

FIG. 4 is a simplified flow chart of control logic for a control routine of validating that the smart ultrasonic stack is valid for a given ultrasonic process recipe before using that given ultrasonic process recipe in the control of the ultrasonic process. The control routine starts at 400 and at 402 selects a given ultrasonic process recipe for use. At 404, the control routine determines whether each smart ultrasonic component 201 of the smart ultrasonic stack 202 to be used is associated with the given ultrasonic process recipe. The control routine then proceeds to 406 where it checks whether all of the smart ultrasonic stack components 201 of the smart ultrasonic stack 202 to be used are associated with the given ultrasonic recipe. If not, the smart ultrasonic stack 202 to be used is not valid for the ultrasonic recipe and the control routine branches to 408 where it alerts a user that the smart ultrasonic stack 202 to be used is invalid and proceeds to 401 where it ends without using the given ultrasonic recipe to control the ultrasonic process. If at 406 all the smart ultrasonic stack components 201 of the smart ultrasonic stack 202 to be used found to be associated with the given ultrasonic process recipe, the ultrasonic stack 202 to be used is valid for the given ultrasonic process recipe and the control routine proceeds to 410 where the ultrasonic power supply 104 uses the given ultrasonic process recipe to control the ultrasonic process.

In an aspect, loose joint connections between any of the smart ultrasonic stack components 201, cracked smart ultrasonic stack components 201, and cracked piezo material of ultrasonic converter 206 are associated as operational information with each smart ultrasonic stack component 201 (as applicable). In an aspect, when a smart ultrasonic component 201 is cracked, a user is alerted, such as by the ultrasonic power supply 104, not to use the cracked component. In an aspect, if there is a repeated loose joint between any of smart ultrasonic stack components 201, the user is alerted, such as by the ultrasonic power supply 104, to inspect the joint for possible wear.

FIG. 5 is a simplified flow chart of control logic of a control routine for alerting a user that a smart ultrasonic stack component is cracked and that there are repeated loose connections between smart ultrasonic stack components. The control routine starts at 500 and proceeds to 502 where it checks whether the operational information associated with a smart ultrasonic stack component being considered for use is cracked. If the operational information indicates that the smart ultrasonic stack component under consideration is cracked, the control routine branches to 504 where it alerts a user that the smart ultrasonic stack component is cracked and then proceeds to 506. If at 502 the operational information indicated that the smart ultrasonic stack component under consideration was not cracked, the control routine proceeds to 506. At 506, the control routine checks where the operational information associated with the smart ultrasonic stack components in the smart ultrasonic stack indicates that there have been repeated loose joint connections between any of the smart ultrasonic stack components. If so, the control routine proceeds to 508 where it alerts a user to check for loose joints and branches back to 502. If at 506 the operational information did not indicate repeated loose joint connections between ultrasonic smart stack components, the control routine branches back to 502.

In an aspect, the operational information includes service information which includes the build location and date, service history, warranty status, remaining unit life, and service notices which are associated, as applicable, with the smart ultrasonic stack components 201.

In an aspect, information about each ultrasonic smart stack component's 201 identify, including, but not limited to: its component name, catalog number, serial number, build date, and build location is associated with that ultrasonic smart stack component, similar to that described in the Background of the present application with respect to ultrasonic stack components.

It should be understood that the information about the smart ultrasonic stack component 201 can be input into the ultrasonic power supply 104 using known methods, such as user interface devices such as keyboards or touch screens, voice input, scan devices, RF ID readers, USB ports, or the ultrasonic power supply accessing the database in which the unique identification code of the smart ultrasonic stack component and associated information are stored and retrieving the associated information from the database. The method used depends on the way in which the information was associated with the smart ultrasonic stack component.

An advantage of the foregoing is that the mechanical excitation amplitude of the smart ultrasonic stack 200 can be fine-tuned to account for variations in piezo material and manufacturing variances when the smart ultrasonic stack components 201 are swapped without having to measure the mechanical to electrical excitation amplitude in situ. Measuring in situ is often impractical.

Another advantage is that the smart ultrasonic stack components can be easily swapped, and the amplitude of mechanical excitation be precisely controlled.

In an aspect, a housed converter has a piezo stack, electrodes, front driver, back driver and fixing means (bolt). A micron level displacement sensor is located in a housing of the housed converter. This sensor may be, for example, a confocal fiber displacement sensor ZW-7000 Series available from OMRON Corporation, Shiokoji Horikawa, Shimogyo-ku, Kyoto 600-8530, Japan. This sensor can be mounted in the inside of the converter to monitor the displacement of the back driver which is identical to the displacement of the front driver since the transducer is a half wave resonant device. The signal from this sensor can be fed back to a typical control that knows the relationship between motional voltage and displacement. Knowing this relationship, the amplitude of the converter can be accurately controlled. If one inputs the gain of the remainder of the stack (booster and horn) accurate control of the face of the horn can be achieved. This sensor can also be placed in the base of the ultrasonic welder to monitor the displacement of the horn that contacts the parts to be welded. One of skill in the art would understand that there are alternate mounting methods and locations to accomplish this readily determinable by one of skill in the art.

In another aspect, the converter housing contains a thermal sensor to monitor the temperature of the piezo's. Amplitude control of the converter could be modified based on the temperature of the stack. The device could also alert the user if the stack exceeds a critical temperature related to depolling conditions that can cause permanent damage to the piezoelectric material. Also, a thermal sensor can be used to monitor the horn temperature and thus modify the amplitude as a function of horn temperature.

As used herein, the term controller, control module, control system, or the like may refer to, be part of, or include an Application Specific Integrated Circuit (ASIC); an electronic circuit; a combinational logic circuit; a field programmable gate array (FPGA); a processor (shared, dedicated, or group) that executes code; a programmable logic controller, programmable control system such as a processor based control system including a computer based control system, a process controller such as a PID controller, or other suitable hardware components that provide the described functionality or provide the above functionality when programmed with software as described herein; or a combination of some or all of the above, such as in a system-on-chip. The term module may include memory (shared, dedicated, or group) that stores code executed by the processor. When it is stated that such a device performs a function, it should be understood that the device is configured to perform the function by appropriate logic, such as software, hardware, or a combination thereof.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A method of controlling an ultrasonic system, comprising:
providing the ultrasonic system with a smart ultrasonic stack having a plurality of smart ultrasonic stack components including at least a smart ultrasonic converter and at least one smart ultrasonic stack component that is a passive ultrasonic component with each smart ultrasonic stack component having an amplitude parameter associated therewith by having that amplitude parameter stored at the smart ultrasonic stack component or in a database with an identifier that identifies the smart ultrasonic stack component with which that amplitude parameter is associated;
having an ultrasonic power supply that excites the ultrasonic converter read the amplitude parameter associated with each smart ultrasonic stack component and determine based on the amplitude parameter associated with each smart ultrasonic stack component an AC excitation signal with which to excite the smart ultrasonic converter; and
having the ultrasonic power supply operate the ultrasonic system by exciting the smart ultrasonic converter with the determined AC excitation signal.

2. The method of claim 1 including each time a smart ultrasonic stack component is replaced with a replacement smart ultrasonic component, reading with the ultrasonic power supply the amplitude parameter associated with the replacement smart ultrasonic component and having the ultrasonic supply update the amplitude parameters on which it determines the AC excitation signal by using the amplitude parameter about the replacement smart ultrasonic component instead of the amplitude parameter of the smart ultrasonic component that was replaced.

3. The method of claim 1 further including measuring the amplitude parameter of each of the smart ultrasonic stack components and associating the measured amplitude parameter with that smart ultrasonic stack component wherein the amplitude parameter of the ultrasonic converter is a mechanical to electrical excitation coupling ratio of the ultrasonic converter and the amplitude parameter of each smart ultrasonic stack component that is a passive ultrasonic stack component is a mechanical gain of that smart ultrasonic stack component.

4. The method of claim 3 including before a smart ultrasonic component is installed in the smart ultrasonic stack, measuring the amplitude parameter of that smart ultrasonic stack component and associating that measured amplitude parameter with that smart ultrasonic stack component, and inputting the measured amplitude parameter into the ultrasonic power supply as the amplitude parameter for that smart ultrasonic component when that smart ultrasonic component is installed in the ultrasonic stack.

5. The method of claim 4 wherein measuring the amplitude parameter of any of the smart ultrasonic stack components and associating it with that smart ultrasonic stack component includes doing so when that smart ultrasonic stack component is manufactured.

6. The method of claim 1 wherein associating the amplitude parameter of any of the smart ultrasonic stack components with that smart ultrasonic stack component includes labeling that smart ultrasonic stack component with the amplitude parameter of that smart ultrasonic stack component and having the ultrasonic power supply read the amplitude parameter includes having the ultrasonic power supply read the amplitude parameter labeled on the smart ultrasonic stack component.

7. The method of claim 1 wherein associating the amplitude parameter of any of the smart ultrasonic stack components with that smart ultrasonic stack component includes storing the amplitude parameter of that smart ultrasonic stack component in a database and having the ultrasonic power supply read the amplitude parameter includes having the ultrasonic power supply read the amplitude parameter from the database.

8. The method of claim 7 wherein storing the amplitude parameter of any of the smart ultrasonic stack components in a database includes storing that amplitude parameter in a database on a remote system accessible by the ultrasonic power supply.

* * * * *